United States Patent
Leone et al.

(10) Patent No.: US 8,977,470 B2
(45) Date of Patent: Mar. 10, 2015

(54) METHOD AND SYSTEM FOR SAMPLING INTAKE MANIFOLD PRESSURE

(75) Inventors: Thomas G. Leone, Ypsilanti, MI (US);
Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 676 days.

(21) Appl. No.: 13/231,170

(22) Filed: Sep. 13, 2011

(65) Prior Publication Data

US 2013/0066535 A1  Mar. 14, 2013

(51) Int. Cl.
*F02D 9/02* (2006.01)
*F02D 41/00* (2006.01)
*F02D 41/14* (2006.01)
*F02D 41/22* (2006.01)

(52) U.S. Cl.
CPC .......... *F02D 41/0002* (2013.01); *F02D 41/008* (2013.01); *F02D 41/145* (2013.01); *F02D 2200/0408* (2013.01); *F02D 2250/14* (2013.01); *F02D 41/221* (2013.01); *F02D 41/0007* (2013.01); *F02D 2200/0406* (2013.01); *Y02T 10/42* (2013.01)
USPC .......................................... 701/103; 123/336

(58) Field of Classification Search
CPC ..... F02D 41/30; F02D 41/00; F02D 41/0025; F02D 41/0002; F02D 41/0007; F02D 41/0072; F02D 2200/0406; F02D 13/0207; F02D 2041/001; F02D 2250/18; Y02T 10/47; F02M 25/0707; F02M 25/0754; F02B 2075/125
USPC ............... 123/684, 704, 568.22, 179.18, 442, 123/336; 701/103; 60/274, 605.1
See application file for complete search history.

(56) References Cited

U.S. PATENT DOCUMENTS

| 5,542,388 A | 8/1996 | Ichinose et al. |
| 5,596,957 A * | 1/1997 | Ichinose et al. .......... 123/179.18 |
| 5,632,249 A | 5/1997 | Sadakane et al. |
| 6,212,881 B1 * | 4/2001 | Takahashi et al. .............. 60/274 |

(Continued)

FOREIGN PATENT DOCUMENTS

| EP | 0573895 A1 | 12/1993 |
| EP | 1306829 A2 | 5/2003 |
| JP | 8109836 A | 4/1996 |

OTHER PUBLICATIONS

Kapus, P.E. et al., "Ethanol Direct Injection on Turbocharged Si Engines—Potential and Challenges," SAE Technical Paper Series 011408, World Congress, Detroit, MI., Apr. 16-19, 2007, 11 pages.
Colpin, C. et al., "Key Parameters for Startability Improvement Applied to Ethanol Engines," SAE Technical Paper Series No. 010616, Renault SAS, 2009, 9 pages.

(Continued)

*Primary Examiner* — Lindsay Low
*Assistant Examiner* — Gonzalo Laguarda
(74) *Attorney, Agent, or Firm* — Julia Voutyras; Alleman Hall McCoy Russell & Tuttle LLP (57) ABSTRACT

An engine system and method for improving sampling of a port throttle pressure sensor. In one example, the port throttle pressure sensor is sampled a plurality of times during a cylinder cycle and different engine operating conditions are determined from selected samples. The system and method may improve engine air-fuel control as well as engine diagnostics.

17 Claims, 5 Drawing Sheets

(56) References Cited

U.S. PATENT DOCUMENTS

| | | | |
|---|---|---|---|
| 6,543,220 B2 | 4/2003 | Yoshida et al. | |
| 6,622,486 B2 | 9/2003 | Jarvi | |
| 6,675,768 B2 | 1/2004 | Kanai | |
| 6,915,788 B2 | 7/2005 | Nakamura | |
| 7,347,183 B2 * | 3/2008 | Tabata et al. | 123/336 |
| 7,404,392 B2 * | 7/2008 | Weiss et al. | 123/442 |
| 7,607,422 B2 * | 10/2009 | Carlson et al. | 123/672 |
| 7,918,090 B2 * | 4/2011 | Suzuki et al. | 60/602 |
| 8,014,931 B2 * | 9/2011 | Araki et al. | 701/103 |
| 8,371,266 B1 * | 2/2013 | Ulrey et al. | 123/336 |
| 2003/0217739 A1 | 11/2003 | Saeki et al. | |
| 2004/0237931 A1 | 12/2004 | Okamoto et al. | |
| 2006/0225698 A1 * | 10/2006 | Nogi et al. | 123/336 |
| 2008/0184705 A1 | 8/2008 | Dumas et al. | |

OTHER PUBLICATIONS

Nakajima, Susumu, "Research into Optimal Specifications for Flexible Fuel Vehicle Engines," SAE Technical Paper Series No. 011097, Honda R&D Co., Ltd, 2010, 10 pages.

Colli, Gustavo Beira et al., "Heated Injector Cold Start System for Flex-Fuel Motorcycles," SAE Technical Paper Series No. 360156, Congresso 2010 SAE Brasil, São Paulo, Brasil, Oct. 5-7, 2010, 19 pages.

Leone, Thomas G. et al., "Method for Improving Engine Starting," U.S. Appl. No. 13/227,670, filed Sep. 8, 2011, 36 pages.

Lewis, Donald J. et al., "Method and System for Adjusting Port Throttles," U.S. Appl. No. 13/227,680, filed Sep. 8, 2011, 45 pages.

Leone, Thomas G. et al., "Pulsation Absorption System for an Engine," U.S. Appl. No. 13/290,728, filed Nov. 7, 2011, 31 pages.

Leone, Thomas G. et al., "Method and System for Improving Engine Starting," U.S. Appl. No. 13/326,150, filed Dec. 14, 2011, 48 pages.

* cited by examiner

METHOD AND SYSTEM FOR SAMPLING INTAKE MANIFOLD PRESSURE

BACKGROUND/SUMMARY

A port throttled engine may provide fuel efficiency and/or performance benefits as compared to engines that are not port throttled. However, it may be more difficult to determine cylinder air charge or trapped mass of a port throttled engine when cylinder air trapped mass of the port throttled engine is estimated based on an intake manifold pressure sensor that is positioned upstream of the port throttle or when the engine has a mass air flow sensor positioned upstream of the port throttle. In particular, a manifold absolute pressure sensor (MAP) may not be subject to the pressure at the cylinder intake port. As such, a cylinder air trapped mass estimated from the MAP sensor may not be as accurate as is desired. Even a MAP sensor positioned downstream of the port throttle may provide in accurate cylinder air trapped mass estimates with conventional signal processing due to large pressure fluctuations during each engine cycle. Further, a cylinder air trapped mass estimate that is based on a mass airflow sensor positioned upstream of the port throttle may not provide as accurate cylinder air trapped mass estimates as is desired during transient changes in intake manifold pressure due to the remoteness of the mass air flow sensor.

The inventors herein have recognized the above-mentioned limitations and have developed a method of sampling, a method of sampling, comprising: sampling a sensor positioned in an intake port downstream of a port throttle, the intake port leading to a single cylinder, the sensor sampled at a first time and a second time during a cycle of the single cylinder; and adjusting a first actuator responsive to a first sample taken at the first time and adjusting a second actuator responsive to a second sample taken at the second time.

By positioning a pressure sensor between an intake valve of a cylinder and a port throttle it may be possible to accurately determine MAP and trapped mass of a cylinder. In particular, if a sensor positioned between an intake poppet valve of a cylinder and a port throttle that regulates air flow to an individual cylinder is sampled near intake valve closing (IVC) time as well as just before intake valve opening (IVO) time, cylinder trapped mass may be determined via the first sample while MAP may be determined via the second sample. The mass trapped in the cylinder during a combustion cycle may be more accurately determined when the sensor is sampled near IVC since cylinder intake port pressure at that time is close to cylinder pressure. Further, engine MAP may be accurately determined without locating a MAP sensor in the intake manifold via sampling the intake port sensor at a time where pressure in the cylinder intake port has time to recover and approach or reach MAP. Thus, at least two different control variables may be more accurately determined from two or more different samples taken during a cylinder cycle. Further, the timing at which the samples are taken may act to improve estimation of control variables from which actuators may be adjusted.

The present description may provide several advantages. Specifically, the approach may improve estimates of MAP, cylinder trapped mass, and exhaust pressure. Further, the approach may reduce the number of samples used to determine multiple control variables. In addition, strategically determined sample times may reduce signal processing timing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
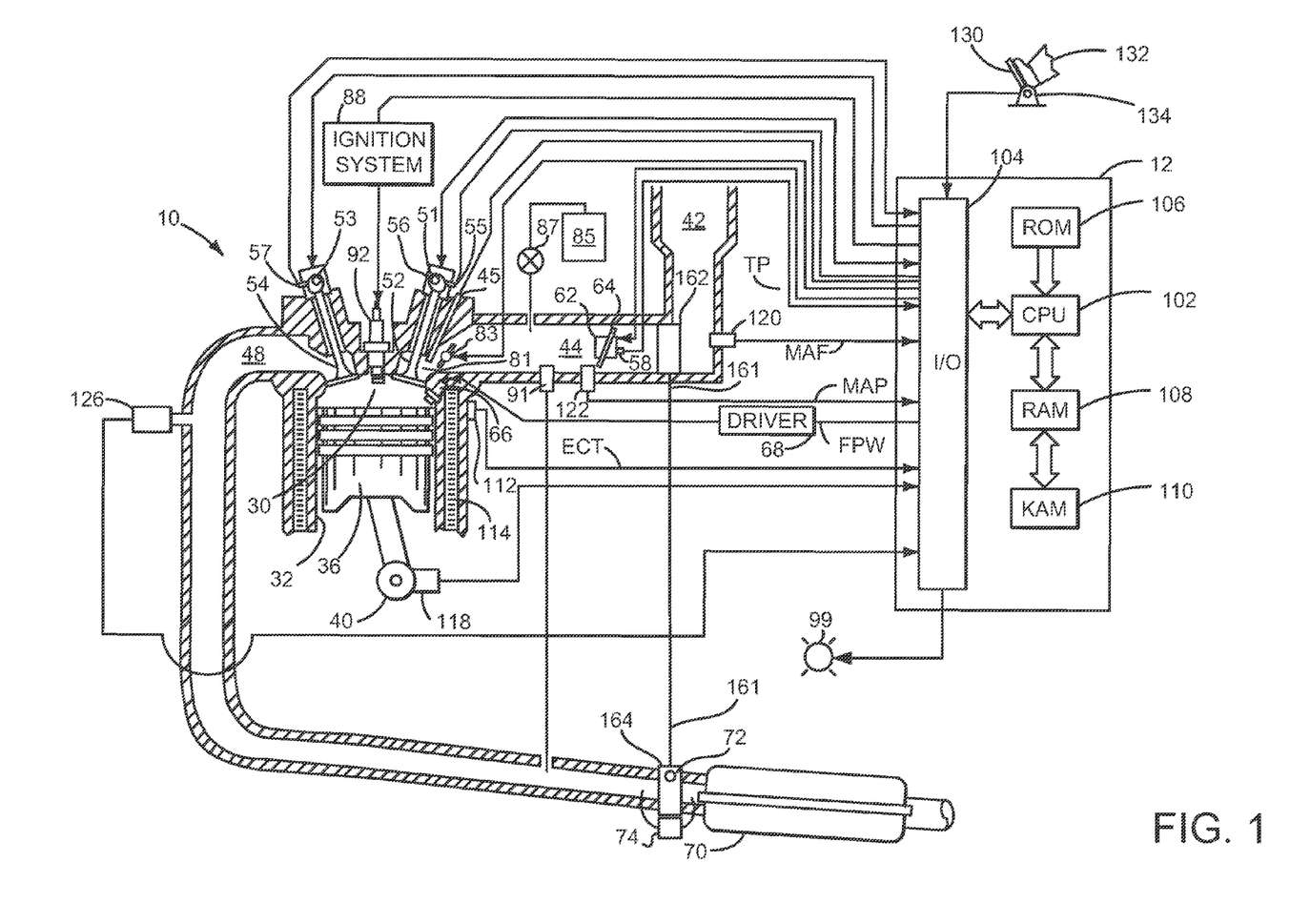
FIG. 1 shows a schematic depiction of an engine.
Figure 2:
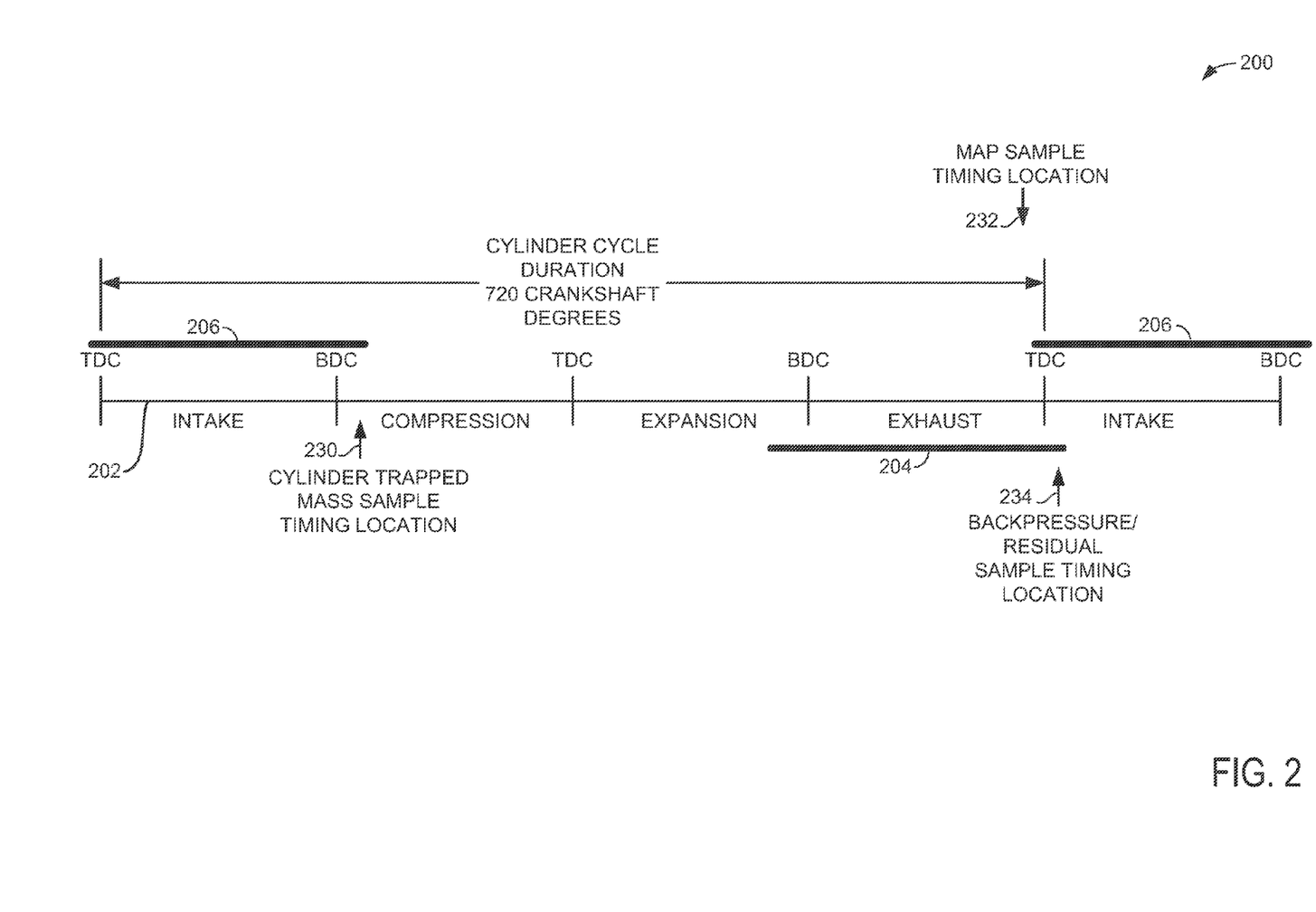
FIG. 2 shows an example cylinder cycle sampling timing diagram.
Figure 3:
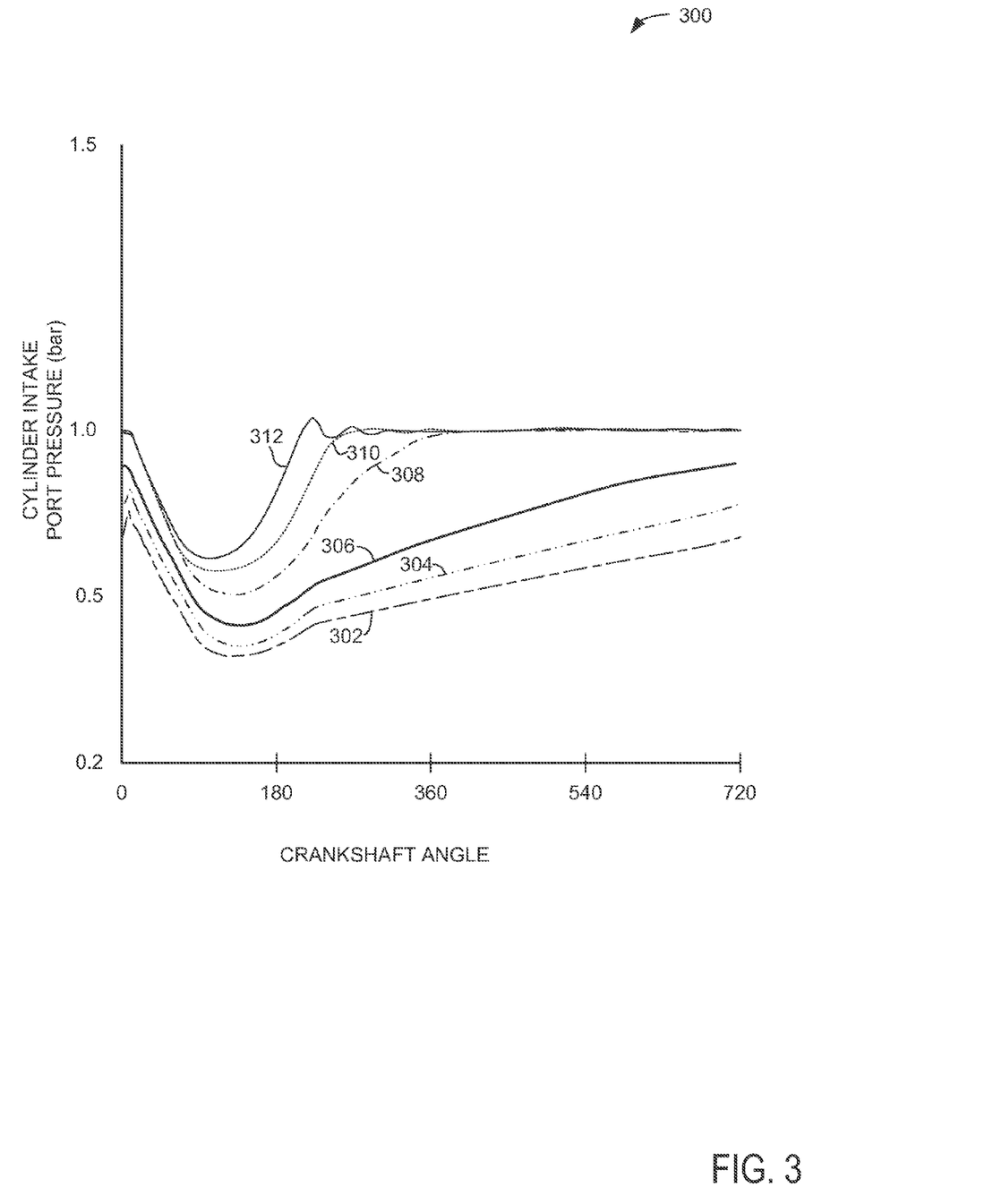
FIG. 3 shows an example plot of cylinder intake port pressure response for an engine having a port throttle.
Figure 4:
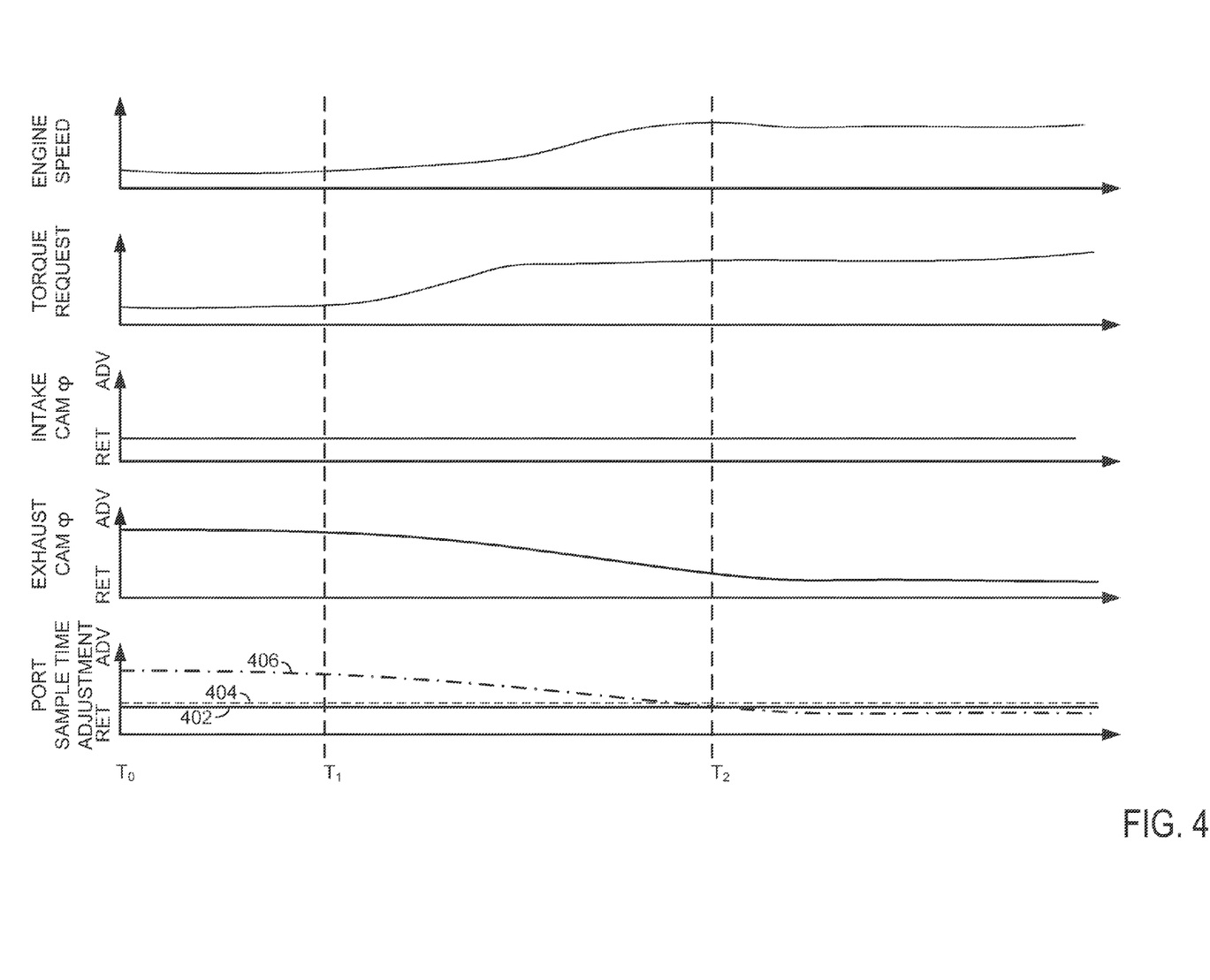
FIG. 4 shows an example of sampling engine cylinder intake port pressures over varying engine operating conditions.
Figure 5:
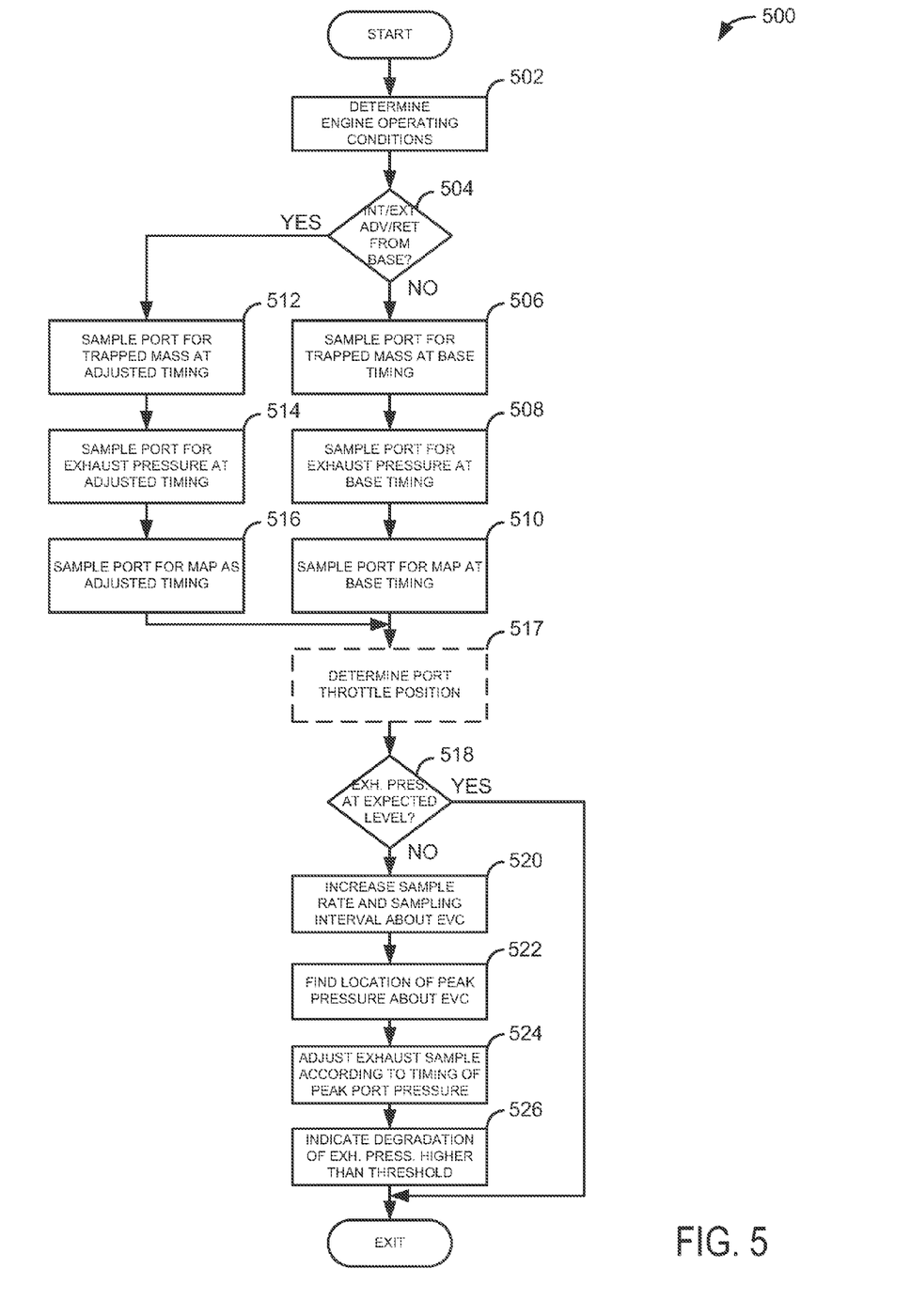
FIG. 5 shows a flowchart of an example method for sampling an engine cylinder intake port having a port throttle.

The present description is related to sampling pressure in a cylinder intake port of an engine having port throttles. By sampling pressure in the cylinder intake port at selected times during a cylinder cycle, it may be possible to improve estimates of engine operating conditions. FIG. 1 shows one example of an engine that includes a port throttle and an air inlet throttle. The system of FIG. 1 may be sampled at selected intervals or times during a cylinder cycle as shown in FIG. 2 to provide information that may be the basis for determining different engine operating conditions. FIG. 3 shows example cylinder intake port pressure responses at different engine operating conditions for a port throttled engine. In one example, cylinder intake port throttles may be sampled as shown in FIG. 4 to provide an improved estimate of engine operating conditions. Finally, FIG. 5 shows an example of a method for sampling cylinder intake port pressure.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Cam phaser 56 adjust timing of intake cam 51 relative to crankshaft 40. Additionally, an exhaust cam phaser may be provided to adjust timing of exhaust cam 53 relative to crankshaft 40. The position of intake cam 51 may be determined by intake cam sensor 55. The position of exhaust cam 53 may be determined by exhaust cam sensor 57. Compressor 162 draws air from air intake 42 to supply boost air to the engine. Exhaust gases spin turbine 164 which is coupled to compressor 162 via shaft 161. In some examples, a charge air cooler may be provided. Compressor speed may be adjusted via adjusting a position of variable vane control 72. In alternative examples, a waste gate 74 may replace variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, waste gate 74 allows exhaust gases to flow around turbine 164 so as to reduce the amount of energy supplied to the turbine.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from engine air intake 42. Port throttle 83 controls air flow into cylinder 30 via restricting air or opening to allow air to flow into cylinder intake port 81. In engines with a plurality of cylinders a plurality of individually controlled port throttles may be provided so that a port throttle regulating air flow to a single individual cylinder may be positioned differently from port throttles of another cylinder. EGR valve 91 controls the flow of exhaust gas into intake manifold 44.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Fuel vapors from a fuel tank (not shown) may be stored in fuel vapor storage canister 85. In some examples, fuel vapor storage canister 85 includes activate carbon to store fuel vapors. Fuel vapors may be combusted by engine 10 by opening fuel vapor purge valve 87 and drawing fuel vapors into intake manifold 44.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; an optional measurement of engine manifold pressure (MAP) from pressure sensor 122 coupled to intake manifold 44; a measurement of intake port pressure from pressure sensor 45 located downstream of port throttle 83; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. A condition of degradation may be indicated via an output to indicator light or display 99. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a system for sampling pressure in a cylinder intake port, comprising: an engine; an intake manifold coupled to the engine; an air inlet throttle positioned upstream of the intake manifold; a cylinder intake port supplying air to a cylinder of the engine; a port throttle positioned along the cylinder intake port and upstream of a poppet valve of the cylinder; a sensor located along the cylinder intake port between the port throttle and the poppet valve; a fuel injector supplying fuel to the cylinder; a turbocharger supplying air to the cylinder intake port, the turbocharger having a waste gate; and a controller including instructions to initiate first and second samples from the sensor during a cycle of a cylinder, the controller including further instructions to adjust the fuel injector in response to a first sample, the controller including further instructions to adjust a position of the waste gate in response to the second sample without responding to the first sample. In this way, the fuel injection can be adjusted according to cylinder air charge as determined from on sample of a pressure sensor. Further, a position of a turbocharger waste gate or vane may be adjusted according to an amount of exhaust back pressure determined from a cylinder intake port pressure sensor.

In some examples, the system further comprises an EGR valve. In other examples, the system further comprises additional controller instructions for sampling the sensor a third time during the cylinder cycle and adjusting a position of the EGR valve in response to the third sample, and where the third sample is indicative of MAP. The system further comprises additional controller instructions for adjusting a position of the port throttle based on output of the sensor. The system further comprises additional controller instructions for adjusting the timing of sampling the sensor in response to intake and exhaust valve timing. In this way, the system of FIG. 1 can improve estimates of engine control variables.

Referring now to FIG. 2, an example cylinder cycle sampling timing diagram is shown. An engine may include a cylinder cycle for each cylinder of the engine. For example, a four cylinder engine has four cylinder cycles. The four cylinder cycles occur within one engine cycle (e.g., 720 crankshaft degrees). FIG. 2 shows a cycle of one cylinder of an engine. Timing diagram 200 includes a timeline 202 that is broken down into cylinder strokes of a cylinder as the engine rotates in time. Other engine cylinders exhibit similar characteristics but vary in phase from the illustrated cylinder. Time proceeds from the left to right side of timing diagram 200. One cylinder cycle (e.g., 720 crankshaft degrees for a four stroke engine as shown) plus one cylinder stroke is the duration of timeline 202. Timeline 202 begins with an intake stroke which is followed by a compression stroke, expansion stroke, and an exhaust stroke. The cylinder cycle repeats as indicated by a second intake stroke.

Line 206 represents duration of opening time of an intake valve of a cylinder (e.g., 52 of FIG. 1) during the cylinder cycle. Thus, in this example, the intake valve opens shortly before top dead center (TDC) intake stroke of the cylinder and closes shortly after bottom dead center (BDC) compression stroke of the cylinder. Line 206 repeats toward the end of timeline 202.

Line 204 represents duration of opening time of an exhaust valve of the cylinder (e.g., 54 of FIG. 1) during the cylinder cycle. In this example, the exhaust opens before BDC exhaust stroke of the cylinder and closes after TDC of the intake stroke of the cylinder.

Arrows 230-234 represent sample times during a cylinder cycle for sampling pressure in a cylinder intake port (e.g., 81 of FIG. 1) between a port throttle (e.g., 83 of FIG. 1) and a cylinder intake valve (e.g., 52 of FIG. 1). A cylinder intake port can provide pressure data at different times during a cylinder cycle to identify or infer different engine operating conditions. For example, arrow 230 represents crankshaft timing in degrees where cylinder intake port pressure downstream of a port throttle is indicative of mass trapped in a cylinder during a compression stroke. On the other hand, arrow 232 represents crankshaft timing in degrees where cylinder intake port pressure downstream of the port throttle is indicative of MAP (e.g., pressure in an intake manifold between an air inlet throttle and a port throttle). Further, arrow 234 represents crankshaft timing in degrees where cylinder intake port pressure is indicative of internal residuals and exhaust pressure.

When a sample of cylinder intake port pressure is taken at the timing shown by arrow 230, cylinder pressure is at a higher pressure since the intake valve has been open to allow pressure equalization between the intake manifold and the cylinder. Further, the cylinder intake port pressure sampled at the time of arrow 230 combined with the volume of the cylinder allows cylinder trapped mass to be determined according to the ideal gas law pv=nRT. Thus, sampling pressure in the cylinder intake port at or near intake valve closing (IVC) time provides an improved pressure measurement of an amount of mass that gets trapped in the cylinder during the compression stroke. It should be noted that sampling the cylinder intake port pressure at IVC includes sampling pressure at the cylinder intake port up to a predetermined number of crankshaft degrees before IVC (e.g., 30 degrees advanced of IVC). In order to reduce computational load of the controller, a single sample of cylinder intake port pressure may be taken near IVC.

Sampling cylinder intake port pressure at or just before intake valve opening (IVO) time as indicated by arrow 232 provides pressure information that is indicative of MAP because pressure in the cylinder intake port has the longest amount of time to recover after a previous intake event when the intake valve is open. It should be noted that sampling the cylinder intake port pressure at IVO includes sampling pressure at the cylinder intake port up to a predetermined number crankshaft degrees before IVO (e.g., 30 degrees advanced of IVO). In order to reduce computational load of the controller, a single sample of cylinder intake port pressure may be taken at IVO.

Sampling the cylinder intake port pressure at the timing shown by arrow 234 allows pressure equalization between the exhaust manifold, the cylinder, and the cylinder intake port. Thus, sampling the cylinder intake port pressure before exhaust valve closing (EVC) while the intake valve is open exposes the cylinder intake port to a pressure indicative of cylinder pressure and exhaust manifold pressure. It should be noted that sampling the cylinder intake port pressure at EVC includes sampling pressure at the cylinder intake port up to a predetermined crankshaft degrees before EVC (e.g., 30 crankshaft advanced of EVC). In order to reduce computational load of the controller, a single sample of cylinder intake port pressure may be taken at EVC.

Thus, as indicated by the sample timings shown in FIG. 2, cylinder trapped mass may be determined in response to a first cylinder intake port pressure sample, MAP may be determined in response to a second cylinder intake port pressure sample, the second cylinder intake port pressure sample at a different crankshaft timing than the first cylinder intake port pressure sample, and cylinder residuals (e.g. exhaust gas) as well as exhaust manifold pressure may be determined in response to a third cylinder intake port pressure sample, the third cylinder intake port pressure sample at a different crankshaft timing than the first and second intake port pressure samples. It should also be noted that crankshaft sample timing may be based on a crankshaft angle rather than time from a clock.

Referring now to FIG. 3, an example plot of cylinder intake port pressure response for an engine having a port throttle is shown. In this example, the engine is throttled solely via port throttles and does not include throttling via an air inlet throttle located upstream of the port throttles. The X axis represents crankshaft angle. The X axis begins at TDC intake stroke of a cylinder during a cylinder cycle and ends 720 crankshaft degrees later. The Y axis represents cylinder intake port pressure in units of bars.

Pressure curve 302 represents pressure in a cylinder intake port between a port throttle and an intake valve of the cylinder when engine load reaches 1 bar IMEP. Pressure curve 304 represents pressure in the cylinder intake port when engine load reaches 1.8 bar IMEP. Pressure curve 306 represents pressure in the cylinder intake port when engine load reaches 2.62 bar IMEP. Pressure curve 308 represents pressure in the cylinder intake port cylinder intake port when engine load reaches 5.5 bar IMEP. Pressure curve 310 represents pressure in the cylinder intake port when engine load reaches 7 bar IMEP. Pressure curve 312 represents pressure in the cylinder intake port when engine load reaches 8 bar IMEP. In order for engine load to reach higher and higher values of IMEP, the cylinder intake port throttles are opened to a further extent so as to increase air flow through the port throttles.

Shortly after zero crankshaft degrees, the cylinder intake port pressure of each curve begins to indicate a pressure drop since the intake valve opens near TDC in this example. However, for curves 302 and 304, the curves rise briefly and then fall as burned gas flows from the cylinder back into the cylinder intake port due to the low cylinder intake port pressure during such conditions. cylinder intake port The pressure rise may be indicative of exhaust manifold pressure since the pressure rise occurs during the intake and exhaust valve overlap period before EVC. In one example, the cylinder intake port pressure may be sampled before EVC and after IVO as indicated by arrow 234 of FIG. 2 so that the peak pressure in the cylinder and cylinder intake port may be established during the intake and exhaust valve overlap period.

At a time shortly after about 200 crankshaft degrees, pressure in the cylinder intake port begins to recover since the intake valve closes and pressure begins to equalize between the cylinder pressure port and the engine intake manifold. The rate that the pressure recovers is related to the cylinder intake port volume and the opening amount of the cylinder intake port throttle. Pressure represented by curve 302 represents a slower pressure recovery in the cylinder intake port than the pressure represented by curve 304 since the port throttle is closed further during the time represented by curve 302.

Referring now to FIG. 4, an example of sampling cylinder port pressures over varying engine operating conditions is shown. The sampling sequence shown in FIG. 4 may be provided by controller 12 of FIG. 1 executing instructions according to the method of FIG. 5.

The first plot from the top of FIG. 4 represents engine speed versus time. The X axis represents time and time increases from the left to right side of the plot. The Y axis represents engine speed and engine speed increases in the direction of the Y axis arrow.

The second plot from the top of FIG. 4 represents engine torque versus time. The X axis represents time and time increases from the left to right side of the plot. The Y axis represents engine torque and engine torque increases in the direction of the Y axis arrow.

The third plot from the top of FIG. 4 represents engine intake cam phase versus time. The X axis represents time and time increases from the left to right side of the plot. The Y axis represents engine intake cam phase and engine intake cam phase advances in the direction of the Y axis arrow.

The fourth plot from the top of FIG. 4 represents engine exhaust cam phase versus time. The X axis represents time and time increases from the left to right side of the plot. The Y axis represents engine exhaust cam phase and engine exhaust cam phase advances relative to crankshaft position in the direction of the Y axis arrow.

The fifth plot from the top of FIG. 4 represents engine cylinder intake port sample time versus time. The X axis represents time and time increases from the left to right side of the plot. The Y axis represents engine cylinder intake port sample time and engine cylinder intake port sample time advances relative to crankshaft position in the direction of the Y axis arrow. Curve 402 represents sample timing relative to crankshaft angle for determining cylinder trapped mass. Curve 404 represents sample timing relative to crankshaft angle for determining MAP. Curve 406 represents sample timing relative to crankshaft angle for determining engine exhaust pressure and cylinder residuals (e.g., exhaust gases).

At time $T_0$, engine speed and requested engine torque are low. In one example, the valve timings are representative of valve timings at idle conditions. The initial intake valve timing is shown at a retarded position. The initial exhaust valve timing is shown at an advanced location. The retarded intake valve timing and the advanced exhaust valve timing provide a low amount of valve overlap at time $T_0$. Thus, only a small amount of internal EGR (e.g., EGR that occurs in the cylinder and is not inducted via the intake manifold) is provided at the lower engine load and speed. The sample timing for determining cylinder trapped mass is retarded to correspond with the retarded intake valve timing. The sample timing for determining MAP is retarded with the retarded intake valve timing. The sample timing for determining exhaust pressure and residuals is advanced corresponding to the advanced exhaust valve timing.

At time $T_1$, the engine torque request begins to increase and engine speed begins to increase in response to the increasing engine torque request. As engine speed and engine load increase, the exhaust valve timing begins to retard. The intake valve timing remains in a retarded position as the engine speed and engine load increase. The timing of sampling for determining exhaust pressure and exhaust residuals changes with the change in exhaust valve timing. Thus, when exhaust valve timing is retarded, the timing of sampling for exhaust pressure retards with exhaust valve timing.

At time $T_2$, the transition from a lower engine speed and load to a higher engine speed and load is completed (e.g., a transition from idle conditions to 1500 RPM 2.6 bar BMEP). The engine speed stabilizes at a medium engine speed and the engine torque stabilizes at a middle level engine torque. The intake valve timing remains at a retarded position and the exhaust valve timing reaches a stabilized retarded timing. The timing of sampling for MAP and cylinder trapped mass stay at retarded positions since intake valve timing has not changed from timing at $T_0$. The timing of sampling for exhaust pressure and cylinder residuals becomes more retarded as the exhaust valve timing is retarded.

In other examples, the intake valve timing may advance while exhaust valve timing is advanced or retarded. During conditions where the intake valve timing advances, the timing of sampling for determining cylinder trapped mass and MAP are advanced with advancing intake valve timing. Further, timing of sampling for cylinder trapped mass and MAP can advance or retard at the same rate as intake valve timing. Similarly, timing of sampling for exhaust pressure and residuals can advance or retard at the same rate as exhaust valve timing. In this way, timing of sampling for cylinder trapped mass, MAP, and exhaust pressure can be adjusted as intake and exhaust valve timing varies.

Referring now to FIG. 5, a flowchart is shown of an example method for sampling an engine cylinder intake port pressure sensor on an engine having a port throttle. The method of FIG. 5 may be applied to each port pressure sensor of an engine having multiple cylinders. In addition, the method of FIG. 5 may be executed via instructions executed in controller 12 of FIG. 1.

At 502, method 500 determines engine operating conditions. Engine operating conditions may be determined via interrogating sensors and actuators via input and output ports of a controller 12 as shown in FIG. 1. Engine operating conditions may include but are not limited to MAP, engine temperature, engine speed, engine load, crankshaft position, camshaft position, pressure within cylinder intake ports downstream of an air inlet throttle and of one or more cylinder intake port throttles. Method 500 proceeds to 504 after engine operating conditions are determined.

At 504, method 500 judges whether or not intake and/or exhaust valve timing have been advanced or retarded from base timing. In one example, camshafts may be pinned at base intake and exhaust camshaft timings. Base valve timings for intake and exhaust valves can vary between different engine designs, but base valve timing provides a useful reference for advancing or retarding sample timing for MAP, cylinder trapped mass, and exhaust pressure samples. If method 500 judges that intake and/or exhaust valve timing has been adjusted, method 500 proceeds to 512. Otherwise, method 500 proceeds to 506.

At 506, method 500 samples the cylinder intake port pressure sensor at a location downstream of a port throttle and upstream of a cylinder intake valve to determine cylinder trapped mass. The cylinder intake port is sampled at a predetermined time (e.g., base sample timing for determining cylinder trapped mass) for determining cylinder trapped mass. In one example, the predetermined time is a crankshaft angle advanced from IVC by a predetermined number of crankshaft degrees. The predetermined number of crankshaft degrees may be between 0 and 30 crankshaft degrees advanced of IVC. In one example, cylinder intake port pressure is sampled 10 crankshaft degrees advanced of IVC. In another example, the sample may be the average signal during a predetermined range of crank angle, such as 15 to 5 degrees advanced of IVC. The cylinder intake port pressure sampled near IVC is converted to a cylinder trapped mass after sampling via the ideal gas equation and an estimated cylinder gas temperature. The cylinder trapped mass may then be the basis for adjusting spark timing, air inlet throttle position, port throttle position, valve timing, EGR rate, fuel injection amount, fuel injection timing, etc. For example, the determined cylinder trapped mass (e.g., from 506) and exhaust gas residual (e.g., from 508) can be subtracted to determine cylinder trapped air mass, which can be divided by a desired air-fuel ratio to determine a fuel mass to inject to the engine. Method 500 proceeds to 508 after the cylinder intake port sensor is sampled at the timing for determining cylinder trapped mass.

At 508, method 500 samples the cylinder intake port sensor where the sensor is at a location downstream of a port throttle and upstream of a cylinder intake valve to determine engine exhaust pressure and cylinder residuals. The cylinder intake port is sampled at a predetermined time for determining engine exhaust pressure (e.g., base sample timing for determining exhaust pressure) and cylinder exhaust gas residuals. In one example, the predetermined time is a crankshaft angle advanced from EVC by a predetermined number of crankshaft degrees. The predetermined number of crankshaft degrees may be between 0 and 30 crankshaft degrees advanced of EVC. In one example, cylinder intake port pressure is sampled 10 crankshaft degrees advanced of EVC. In another example, the sample may be the average signal during a predetermined range of crank angle, such as 15 to 5 degrees advanced of EVC. The cylinder intake port pressure sampled near EVC is converted to an exhaust pressure. In one example, the exhaust pressure may be determined from a table that is indexed via the cylinder intake port pressure sampled near EVC and engine speed. The table contains empirically determined exhaust pressures that are output when indexed by cylinder intake port pressure and engine speed. Additionally, cylinder residual (e.g., exhaust gas) may be determined via the cylinder intake port pressure sampled near EVC. In particular, the ideal gas law may be used to determine the mass of exhaust in the cylinder at the time of EVC. The residual exhaust mass may be subtracted from the cylinder trapped mass determined at IVC to determine the amount of fresh air in the cylinder. The fresh air in the cylinder after IVC is the basis for determining spark timing, injection timing, etc. as described at 506. The exhaust pressure may be the basis for adjusting waste gate or vane position of a turbocharger, external EGR, internal EGR via adjusting valve timing, spark timing, etc. Method 500 proceeds to 510 after acquiring cylinder intake port pressure at a timing that is desirable for determining exhaust pressure and cylinder residuals.

At 510, method 500 samples the cylinder intake port sensor where the sensor is at a location downstream of a port throttle and upstream of a cylinder intake valve to determine MAP. In some examples, MAP may be the basis for determining and controlling EGR flow into the engine intake manifold via an EGR valve, and/or for determining and controlling charcoal canister fuel vapor purge flow into the engine intake manifold via a purge valve, and/or for determining and controlling inlet throttle position and/or port throttle position. In some examples, installing a MAP sensor in an intake manifold may be avoided by using a cylinder intake port sensor to measure MAP. By measuring cylinder intake port pressure before IVO, a measurement of MAP may be made. In some examples, the cylinder intake port pressure may be adjusted to provide an improved estimate of MAP. For example, a function or table may be indexed via engine speed and load to retrieve a term that is added to cylinder intake port pressure to improve the estimate of MAP.

The cylinder intake port pressure sensor is sampled at a predetermined time for determining MAP. In one example, the predetermined time is a crankshaft angle advanced from IVO by a predetermined number of crankshaft degrees. The predetermined number of crankshaft degrees may be between 0 and 30 crankshaft degrees advanced of IVO. In one example, cylinder intake port pressure is sampled 10 crankshaft degrees advanced of IVO. In another example, the sample may be the average signal during a predetermined range of crank angle, such as 15 to 5 degrees advanced of IVO. The cylinder intake port pressure sampled near IVO is identified as a reading of MAP. The MAP may then be the basis for EGR valve position, fuel vapor purge valve position, air inlet throttle position, port throttle position, adjusting spark timing, adjusting valve timing, and fuel injection timing. Method 500 proceeds to 517 or alternatively 518 after the cylinder intake port is sampled at the timing for determining MAP.

At 512, method 500 adjusts the time that engine cylinder intake port pressure is sampled to determine cylinder trapped mass. In one example, the sample time of the cylinder intake port pressure is adjusted based on the timing that IVC is adjusted from base IVC timing. For example, if IVC is retarded 10 crankshaft degrees from base IVC timing, cylinder intake port pressure sampling for determining cylinder trapped mass is retarded 10 crankshaft degrees from base sample timing for determining cylinder trapped mass. In another example, sample time of cylinder intake port pressure is adjusted based on engine speed and the timing IVC is adjusted from base IVC timing.

For example, engine speed and IVC timing index a table of empirically determined sample time adjustments that are then added to the base sample timing for sampling the cylinder intake port. In this way, timing at which cylinder intake port pressure is sampled is adjusted for adjustments to IVC. Further, since the sample timing adjustments include compensation for engine speed, adjustments to sample timing can be greater or less than adjustments to valve timing so that dynamics of the intake system can be compensated. For example, if base cylinder intake port sample timing for cylinder trapped mass is 5 crankshaft degrees advanced from IVC, and engine speed is increased 1000 RPM and IVC is advanced 5 crankshaft degrees, the cylinder intake port pressure sample timing for cylinder trapped mass may be advanced 8 crankshaft degrees. In this example, cylinder intake port sample timing for determining cylinder trapped mass is advanced 5 degrees for the IVC advance and 3 crankshaft degrees based on the change in engine speed. The cylinder trapped mass may then be the basis for adjusting spark timing, throttle position, etc, as described at 506. Method 500 proceeds to 514 after the cylinder intake port sample timing for determining cylinder trapped mass is adjusted and cylinder intake port pressure is acquired.

At 514, method 500 adjusts the time that cylinder intake port pressure is sampled to determine engine exhaust pressure and cylinder exhaust gas residuals. In one example, the sample time of the cylinder intake port pressure is adjusted based on the timing that EVC is adjusted from base EVC timing. For example, if EVC is retarded 10 crankshaft degrees from base EVC timing, cylinder intake port pressure sampling for determining engine exhaust pressure is retarded 10 crankshaft degrees from base sample timing for determining engine exhaust pressure. In another example, sample time of cylinder intake port pressure is adjusted based on engine speed and the timing EVC is adjusted from base EVC timing.

For example, engine speed and EVC timing index a table of empirically determined sample time adjustments that are then added to the base sample timing for sampling the cylinder intake port. In this way, timing at which cylinder intake port pressure is sampled is adjusted for adjustments to EVC. Further, since the sample timing adjustments include compensation for engine speed, adjustments to sample timing can be greater or less than adjustments to valve timing so that dynamics of the exhaust system can be compensated. For example, if base cylinder intake port sample timing for engine exhaust pressure is 5 crankshaft degrees advanced from EVC, and engine speed is increased 1000 RPM and EVC is advanced 5 crankshaft degrees, the sample timing for engine exhaust pressure may be advanced 7 crankshaft degrees. In this example, sample timing for determining cylinder trapped mass is advanced 5 degrees for the EVC advance and 2 crankshaft degrees based on the change in engine speed. The exhaust pressure may be the basis for determining cylinder exhaust gas residuals and for adjusting waste gate or vane position of a turbocharger, external EGR, internal EGR via valve timing, etc. as described at 508. Method 500 proceeds to 516 after the sample timing for determining engine exhaust pressure and residuals is adjusted and intake port pressure is acquired.

At 516, method 500 adjusts the time the cylinder intake port pressure is sampled to determine MAP. In one example, the sample time is adjusted based on the timing that IVO is adjusted from base IVO timing. For example, if IVO is retarded 5 crankshaft degrees from base IVO timing, sampling for determining MAP is retarded 5 crankshaft degrees from base sample timing for determining MAP. In another example, sample time is adjusted based on engine speed and the timing IVO is adjusted from base IVO timing.

For example, engine speed and IVO timing index a table of empirically determined sample time adjustments that are then added to the base sample timing for sampling the cylinder intake port pressure. In this way, timing at which cylinder intake port pressure is sampled is adjusted for adjustments to IVO. Further, since the sample timing adjustments include compensation for engine speed, adjustments to sample timing can be greater or less than adjustments to valve timing so that dynamics of the intake system can be compensated. For example, if base cylinder intake port sample timing for determining MAP is 5 crankshaft degrees advanced from IVO, and engine speed is increased 1000 RPM and IVO is advanced 5 crankshaft degrees, the sample timing for determining MAP may be advanced 8 crankshaft degrees. In this example, sample timing for determining MAP is advanced 5 degrees for the IVO advance and 3 crankshaft degrees based on the change in engine speed. The MAP may then be the basis for EGR valve position, fuel vapor purge valve position, air inlet throttle position, adjusting spark timing, adjusting valve timing, and fuel injection timing. Method 500 proceeds to 517 after the cylinder intake port sample timing for determining MAP is adjusted and cylinder intake port pressure is acquired. In alternative examples, method 500 may proceed to 518.

At 517, method 500 determines port throttle position. Port throttle position may be measured with a position sensor on the throttle shaft or linkage, or it may be inferred in systems that have both a MAP sensor and a cylinder intake port sensor. In one example, port throttle position is inferred based on cylinder intake port pressure recovery. In particular, cylinder intake port pressure trajectories such as those illustrated in FIG. 3 are empirically determined and are stored in memory. The cylinder intake port pressure trajectory during a cylinder cycle is compared to the pressure trajectories stored in memory and the port throttle position is determined from the comparison. The cylinder intake port pressure may be sampled multiple times between intake valve opening events to determine port throttle position.

For example, at selected speed intervals and engine loads, cylinder intake port pressure trajectories are stored in memory. Engine speed and load are used to index tables or functions that store empirically determined cylinder intake port pressure trajectories. The cylinder intake port pressure trajectory from the present engine cycle is compared to the pressure trajectory extracted from the tables or functions. The port throttle position is determined by the stored cylinder intake port pressure trajectory that most closely matches the cylinder intake port pressure trajectory of the present cylinder cycle. Method 500 proceeds to 518 after the position of the port throttle is determined.

At 518, method 500 judges whether or not exhaust pressure for the present cylinder cycle as determined at 508 or 514 is in an expected range. In one example, expected exhaust pressures are stored in memory for selected engine speeds and loads. If the inferred exhaust pressure is greater or less than the expected exhaust pressure by more than a predetermined amount, method 500 proceeds to 520. Otherwise, method 500 proceeds to exit.

At 520, method 500 increases the number samples taken between IVO and EVC. If desired, a number of samples may also be taken after EVC. Increasing the number of samples taken can improve the possibility of detecting a pressure peak caused by exhaust entering the intake port. During conditions where the port throttle is at least partially closed, the port throttle can restrict exhaust flow into the intake manifold allowing the cylinder intake port pressure to increase. Method 500 proceeds to 522 after increasing the number of samples taken between IVO and EVC.

At 522, method 500 processes the cylinder intake port pressure samples and evaluates each sample for the greatest pressure value of samples taken between IVO and EVC. Method 500 stores the value of the peak cylinder intake port pressure and the crankshaft angle at which the peak cylinder pressure occurred in memory and proceeds to 524.

At 524, method 500 adjusts the timing or crankshaft location of where cylinder intake port pressure for determining exhaust pressure is sampled. For example, if at 514 method 500 samples cylinder intake port pressure for determining exhaust pressure at 5 crankshaft degrees advanced of EVC but peak cylinder intake port pressure for determining exhaust pressure is determined to be 8 crankshaft degrees advanced from EVC, sample timing for determining exhaust pressure is revised to 8 crankshaft degrees advanced from EVC at the particular engine operating conditions. Method 500 proceeds to 526 after sampling timing is adjusted.

At 526, method 500 indicates a condition of degradation to an operator of the vehicle if the exhaust pressure determined at 514 or 508 is greater than a desired exhaust pressure. An exhaust pressure that is higher than an expected exhaust pressure may be an indication of a clogged or damaged exhaust aftertreatment device, such as a catalyst or particulate trap. Alternatively, an exhaust pressure that is higher or lower than an expected exhaust pressure may be an indication of a stuck closed or stuck open waste gate, or of turbine vanes that do not move as desired, or of an exhaust system leak. The indication of degradation may be in the form of a light or a display variable. Additionally, engine boost pressure and spark timing may be adjusted in response to the indicated degraded condition so as to limit engine torque. For example, boost pressure may be lowered in response to an indication of exhaust pressure degradation. Method 500 proceeds to exit after indicating degradation to the operator.

Thus, the method of FIG. 5 provides for sampling, comprising: sampling a sensor positioned in an intake port downstream of a port throttle, the intake port leading to a single cylinder, the sensor sampled at a first time and a second time during a cycle of the single cylinder; and adjusting a first actuator responsive to a first sample taken at the first time and adjusting a second actuator responsive to a second sample taken at the second time. The method includes where sensor is sampled at the first time to provide a first variable and where the sensor is sampled at the second time to provide a second variable. The method also includes where the first variable is cylinder air charge and where the second variable is exhaust pressure.

In some examples, the method includes where the first actuator is a fuel injector, turbocharger waste gate, ignition source, inlet throttle, cylinder port throttle, EGR valve, charcoal canister purge valve, and cam phasor, and where the second actuator is waste gate or vane position of a turbocharger, an EGR valve, cam timing or in ignition source. The method also includes where a pressure is sensed in the intake port, and where the sensor is a pressure sensor. The method also includes where the first time is within a predetermined crankshaft angle advanced of IVC and retarded from EVC. Further, the method includes where the second time is within a predetermined crankshaft angle advanced of EVC and retarded from IVO.

The method of FIG. 5 also provides for sampling, comprising: sensing an attribute of a cylinder intake port at a position downstream of a cylinder intake port throttle and upstream of an intake valve via a sensor; sampling the sensor a first time, a second time, and a third time during a cylinder cycle to provide first, second, and third samples; adjusting a first actuator in response to the first sample; adjusting a second actuator in response to the second sample; and adjusting a third actuator in response to the third sample. The method includes where the first time is a predetermined number of crankshaft degrees advanced of IVC and a predetermined number of crankshaft degrees retarded of EVC, where the second time is a predetermined number of crankshaft degrees advanced of EVC and a predetermined number of crankshaft degrees retarded from IVO, and where the third time is a predetermined number of crankshaft degrees advanced of IVO and a predetermined number of crankshaft degrees retarded from EVO. In this way, cylinder port pressure can be adjusted responsive to valve timing.

In some examples, the method further comprises correcting the second time according to a time of peak pressure between IVO and EVC. The method includes where peak pressure is located via increasing a number of samples taken between IVO and EVC. The method further comprises adjusting a position of the cylinder intake port throttle in response to pressure in the cylinder intake port. Further, the method includes where the attribute is a pressure, where the first actuator is a fuel injector, where the second actuator is a turbocharger waste gate, and where the third actuator is an EGR valve. In one example, the method further comprises indicating a degraded condition to an operator in response to an inferred exhaust pressure exceeding a threshold, and where the inferred exhaust pressure is based on the sensor. The method also includes where the cylinder intake port is in fluidic communication with a cylinder, and where the cylinder is included in an engine having a plurality of cylinders, each of the plurality of cylinders including a port throttle.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method of sampling, comprising:
sampling a sensor positioned in an intake port downstream of a port throttle, the intake port leading to a single cylinder, the sensor sampled at a first time and a second time during a cycle of the single cylinder; and
adjusting a first actuator responsive to a cylinder air charge sampled at the first time and adjusting a second actuator responsive to an exhaust pressure sampled at the second time.

2. The method of claim 1, where the first actuator is a fuel injector, turbocharger waste gate or vane position, ignition source, cylinder port throttle, EGR valve, or cam phaser, and where the second actuator is a waste gate or vane position of a turbocharger, inlet throttle, an EGR valve, cam phaser, charcoal canister purge valve, or an ignition source.

3. The method of claim 1, where a pressure is sensed in the intake port, and where the sensor is a pressure sensor.

4. The method of claim 1, where the first time is within a predetermined crankshaft angle advanced of IVC and retarded from EVC.

5. The method of claim 1, where the second time is within a predetermined crankshaft angle advanced of EVC and retarded from IVO.

6. A method of sampling, comprising:
sensing an attribute of a cylinder intake port at a position downstream of a cylinder intake port throttle and upstream of an intake valve via a sensor;
sampling the sensor a first time, a second time, and a third time during a cylinder cycle to provide first, second, and third samples;
adjusting a first actuator in response to the first sample;

adjusting a second actuator in response to the second sample; and adjusting a third actuator in response to the third sample, wherein the attribute is a pressure, where the first actuator is a fuel injector, where the second actuator is a turbocharger waste gate, and where the third actuator is an EGR valve.

7. The method of claim 6, where the first time is a predetermined number of crankshaft degrees advanced of IVC and a predetermined number of crankshaft degrees retarded of EVC, where the second time is a predetermined number of crankshaft degrees advanced of EVC and a predetermined number of crankshaft degrees retarded from IVO, and where the third time is a predetermined number of crankshaft degrees advanced of IVO and a predetermined number of crankshaft degrees retarded from EVO.

8. The method of claim 6, further comprising correcting the second time according to a time of peak pressure between IVO and EVC.

9. The method of claim 8, where peak pressure is located via increasing a number of samples taken between IVO and EVC.

10. The method of claim 6, further comprising adjusting a position of the cylinder intake port throttle in response to pressure in the cylinder intake port.

11. The method of claim 6, where the cylinder intake port is in fluidic communication with a cylinder, and where the cylinder is included in an engine having a plurality of cylinders, each of the plurality of cylinders including a port throttle.

12. A method of sampling, comprising:

sensing an attribute of a cylinder intake port at a position downstream of a cylinder intake port throttle and upstream of an intake valve via a sensor;

sampling the sensor a first time, a second time, and a third time during a cylinder cycle to provide first, second, and third samples;

adjusting a first actuator in response to the first sample;

adjusting a second actuator in response to the second sample; and adjusting a third actuator in response to the third sample, further comprising indicating a degraded condition to an operator in response to an inferred exhaust pressure exceeding a threshold, and where the inferred exhaust pressure is based on the sensor.

13. A system for sampling pressure in a cylinder intake port, comprising:

an engine;

an intake manifold coupled to the engine;

an air inlet throttle positioned upstream of the intake manifold;

a cylinder intake port supplying air to a cylinder of the engine;

a port throttle positioned along the cylinder intake port and upstream of a poppet valve of the cylinder;

a sensor located along the cylinder intake port between the port throttle and the poppet valve;

a fuel injector supplying fuel to the cylinder;

a turbocharger supplying air to the cylinder intake port, the turbocharger having a waste gate; and a controller including instructions to initiate first and second samples from the sensor during a cycle of the cylinder, the controller including further instructions to adjust the fuel injector in response to the first sample, the controller including further instructions to adjust a position of the waste gate in response to the second sample without responding to the first sample.

14. The system of claim 13, further comprising an EGR valve.

15. The system of claim 14, further comprising additional controller instructions for initiating a third sample of the sensor during the cylinder cycle and adjusting a position of the EGR valve in response to the third sample, and where the third sample is indicative of MAP.

16. The system of claim 13, further comprising additional controller instructions for adjusting a position of the port throttle based on output of the sensor.

17. The system of claim 13, further comprising additional controller instructions for adjusting timing of sampling the sensor in response to intake and exhaust valve timing.

* * * * *